United States Patent [19]

Unsin et al.

[11] Patent Number: 5,667,581
[45] Date of Patent: Sep. 16, 1997

[54] QUICK-HARDENING HYDRAULIC BONDING AGENT

[75] Inventors: Joachim Unsin, Heidelberg; Hans Peter Braunbach, Rodenbach; Manfred Tax, Sandhausen, all of Germany

[73] Assignee: Heidelberger Zement AG, Heidelberg, Germany

[21] Appl. No.: 660,715

[22] Filed: Jun. 10, 1996

Related U.S. Application Data

[63] Continuation of Ser. No. 468,184, Jun. 6, 1995, abandoned, which is a continuation of Ser. No. 166,106, Dec. 14, 1993, abandoned.

[30] Foreign Application Priority Data

Dec. 14, 1992 [DE] Germany .................. 42 42 107.1

[51] Int. Cl.$^6$ .................. C04B 22/10; C04B 24/04
[52] U.S. Cl. .................. 106/724; 106/725; 106/728; 106/819; 106/823
[58] Field of Search .................. 106/713, 724, 106/726, 728, 819, DIG. 1, 725, 823

[56] References Cited

U.S. PATENT DOCUMENTS

| | | | |
|---|---|---|---|
| 4,032,353 | 6/1977 | Ball et al. | 106/725 |
| 4,082,561 | 4/1978 | Nakagawa et al. | 106/819 |
| 4,168,985 | 9/1979 | Kolar et al. | 106/725 |
| 4,190,454 | 2/1980 | Yamagisi et al. | 106/708 |
| 4,264,367 | 4/1981 | Schutz | 106/738 |
| 4,997,484 | 3/1991 | Gravitt et al. | 106/708 |
| 5,273,579 | 12/1993 | Tanaka et al. | 106/728 |

*Primary Examiner*—Paul Marcantoni
*Attorney, Agent, or Firm*—Staas & Halsey

[57] ABSTRACT

The present invention relates to a quick-hardening hydraulic bonding agent consisting of calcium silicate cement, particularly Portland cement, as well as additives and/or common admixtures which is characterized by a content of: 94.70 to 99.79% in weight of calcium silicate cement; 0.01 to 2.0% in weight of an organic and/or inorganic accelerator for the hydration of the calcium silicates; 0.1 to 3.0% in weight of an organic and/or inorganic retarding agent which inhibits the hydration of the calcium silicates, possibly having a liquefying effect; 0.01 to 0.30% in weight of an inhibiting agent with respect to the formation of the calcium aluminate sulfate hydrates.

9 Claims, No Drawings

QUICK-HARDENING HYDRAULIC BONDING AGENT

This is a continuation of application Ser. No. 08/468,184, filed Jun. 6, 1995, now abandoned, which is a continuation of application Ser. No. 08/166,109, filed Dec. 14, 1993, now abandoned.

The invention relates to a quick-hardening bonding agent which is to be used with water and possibly with admixtures and additives.

The term "calcium silicate cement" denotes hydraulic bonding agents whose development with respect to their resistance to pressure, after having been mixed with water, is based predominantly on the formation of calcium silicate hydrates. It therefore comprises, for example, all cement types standardized according to DIN 1164. In a wider sense, the term is used for delimitation purposes with respect to bonding agents whose strength development is based exclusively or mainly on other hardening mechanisms, such as the hydration of calcium aluminates in the case of so-called aluminous cement types or high alumina or CA-cement types.

The term "Portland cement" is to comprise those hydraulic bonding agents which are called Portland cement by persons skilled in the art in a narrower sense, and as described, for example, in ASTM Standard C150, in which case Types I, II or III are particularly preferred for the purpose of the invention, although other forms of Portland cement are also suitable.

The terms "additives and "admixtures" are to include substances according to the explanation of terms according to DIN 1045 and DIN 4226.

In the past, many different methods have been used for the development of quick-hardening hydraulic bonding agents with high early and final strengths, and numerous methods and compositions are known today.

In order to avoid the forming of special quick-hardening cement clinkers by burning based on special raw mixtures while using special raw materials, and therefore also to avoid the dependencies on specific production sites, intensive research and development work has been carried out during the last decades in the field of mixed cement types. In the process, various researchers have worked out systems that are increasingly productive.

First, the bonding agents should be mentioned here whose basis is a mixture of Portland cement and aluminous cement. In this case, these mixtures of commercially available or modified Portland cement and calcium aluminate or aluminous cement which result in quick-setting agents of a moderate early and final strength were further developed by the addition of a number of finely coordinated active ingredients to form quick-hardening cement types with a better adjustable start of the setting, with a rapidly beginning early-strength development and with good final strengths.

The following is to be stated in this respect concerning the state of the art: From Europe an Patent Document EP-PS 0 228 595, a quick-hardening bonding agent mixture is known which contains Portland cement clinkers, reactive calcium aluminates and/or aluminous cement, reactive calcium sulfate, an organic retarding agent as well as alkali carbonate.

In this case of this bonding agent mixture, a steep hardening characteristic with high early and final strengths is obtained after the end of the pot time.

The disadvantage of this bonding agent consists of the necessarily strict and limiting requirements when selecting the base materials. Thus, no commercially available Portland cement can be used as the main constituent but Portland cement clinkers must be used which is ground without any addition or of plaster and to which a small amount of calcium sulfate is admixed.

In addition, in European Patent Document EP-PS 0 213 390, a mortar mixture is described which, in addition to conventional admixtures and additions, contains reactive calcium silicates, reactive aluminates, calcium hydroxide, calcium sulfate hydrate, calcium sulfate anhydrite II and organic retarding agents, in which case an increase of the amount of reactive aluminates causes an increase of the early and final strengths which is a measure that results in a considerable increase of material costs.

In view of the content of reactive calcium aluminates or aluminous cement in quick-hardening bonding agents of the above-mentioned type, the above-indicated documents show that the experts in this field consider proportions of at least 5% by weight and normally considerably higher proportions absolutely necessary.

By means of the present invention, it was now determined how, in a simple manner, a quick-hardening hydraulic bonding agent with high early and final strengths can be produced without any addition of calcium aluminate or aluminous cement, which bonding agent, while achieving advantages, avoids the disadvantages of the above-described quick-hardening bonding agents of the state of the art.

This object is achieved by a quick-hardening hydraulic bonding agent consisting of a calcium silicate cement, particularly Portland cement, to which a hardening accelerator, particularly 0.1 to 2.0% in weight alkali carbonate, and a retarding agent, particularly an alkali or alkaline earth lignosulfonate in the amount of from 0.1 to 3.0% in weight are admixed.

For adjusting the first start of the setting, a retarding agent (also referred to as "an inhibiting agent") for the formation of the calcium aluminate sulfate hydrates is also used, particularly oxycarboxylic acid, such as tartaric acid or citric acid and/or their easily water-soluble salts, for example, alkali salts in the amount of from 0.01 to 0.3% in weight.

Technical literature in this field has repeatedly reported on a quick-hardening hydraulic bonding agent system in which alkali carbonate is used, on the one hand, and alkali or alkaline earth lignosulfonate is used, on the other hand. Reference is made to the comprehensive and fundamental studies by Stephen Bruneauer, Jan Skalny, Ivan Odler and Marvin Yudenfreund, published in *Cement and Concrete Research*, Vol. 2, 1972, and Vol. 3, 1973.

These studies as well as U.S. Pat. No. 3,689,294 demonstrate the authors' uniform opinion that such a system will only have sufficient processing characteristics when no plaster or calcium sulfate is contained in the mixture; that is, when the system consists of Portland cement clinkers, alkali or alkaline earth lignosulfonate; and alkali carbonate.

In U.S. Pat. No. 3,960,582, an alkali hydrogen carbonate is used instead of the alkali carbonate with the object of achieving a longer processing time. After mixing with water, a number of fairly complex and not completely explained reactions of the additions take place in such a plaster-free system with the constituents of the clinker and also mutually. In addition to the formation of carboaluminates, the presence of alkali carbonate, among other things, also leads to the formation of alkali hydroxide and therefore to a rise of the pH-value in the mixing water, which, in turn, has an effect on the concentration of the $Ca^{++}$-ions in it and, as a result, on the solubility and therefore on the efficiency of, for example, calcium lignosulfonate as well as liquefying as well as retarding substance in view of the hydration of the calcium silicates.

In addition to the two above-mentioned characteristics of the lignosulfonates to have a liquefying and a hardening-retarding effect, they also have the capability, while interacting with alkali carbonate, to themselves actively promote the development of the strengths. However, for this purpose, a specified minimum amount of added lignosulfonate is required. Our own studies have shown now that, when lignosulfonate is added in this required amount which is effective in the caster-free system, the hydration is retarded dramatically of the calcium silicates in commercially available calcium-sulfate-containing Portland cement types of the customary fineness and with the customary grain structure; the Portland cement loses its early-strength potential; and therefore no quick-hardening cement types with very high early strengths can be obtained.

Surprisingly, it was also found that the use of sulfate carrier in the form of the calcium sulfate dihydrate, the calcium sulfate hemihydrate and/or the calcium sulfate anhydrite in the system according to the invention has no disadvantageous effect on the processing characteristics. This will specifically be the case when a portion of the Portland cement is replaced by the corresponding amount of a very fine cement, even if it contains the mentioned sulfate carriers in an amount which corresponds to the DIN 1164Regulations, or even proportions which exceed these and are optimized to the reactivity of the cement clinker.

Such a very fine cement according to the invention is primarily characterized in that it has a specific surface of at least 9,000 cm$^2$/g according to Blaine and a maximum-grain proportion of less than 5% in weight>16 micrometers. As a result of the high specific surface of the very fine cement and its extremely low proportion of coarse particles, its resulting adsorption capacity and its corresponding high reactivity, that is, particularly its high reactive conversion immediately after the addition of the water, the required relatively high proportion of a lignosulfonate can be used as an active ingredient in the Portland cement together with the alkali carbonate, without the requirement of accepting the normally resulting very high retardation of the hydration of the calcium silicates.

The liquefying effect of the lignosulfonate, which is particularly pronounced in a combined action with the alkali carbonate, compensates the water requirement which is at first increased because of the addition of the very free cement. Although, because of the use of a sulfate carrier in the very fine cement, whose composition and amount is optimally coordinated with the reactivity of the cement clinker, during the initial reaction with the mixing water, corresponding to the higher fineness of the cement, larger amounts of tricalcium aluminate ($C_3A$) are reacted to ettringit ($C_3A \cdot 3CaSO_4 \cdot 32H_2O$), this at first develops in the form of short-stem crystals on the cement particles, whereby the processing characteristics of the cement remain virtually unimpaired for a sufficiently long time period.

Furthermore, because of the type and amount of the sulfate carrier which is coordinated with the reactivity of the very fine cement, the formation of monosulfate phases or aluminate hydrates is avoided which grow in the shape of a house of cards between the cement particles and therefore drastically impair the processing characteristics of the cement paste, the mortar or the concrete.

By using smaller amounts of known and conventional retarders, such as tartaric acid, citric acid and their water-soluble salts, such as alkaline salts, the resting period of the bonding agent can still be optimized after the mixing with the water.

By the addition of small amounts of hardening accelerators, such as sodium aluminates, the resting period after the mixing with the water can be shortened. As a rule, modern Portland cement types are produced by using calcium sulfates which, with respect to their type and amount, are optimized with respect to the reactivity of the respective used clinker types. As a result, they are suitable for the use according to the invention.

DESCRIPTION OF SPECIFIC CONTENT OF INVENTIVE BONDING AGENTS

A quick-hardening hydraulic bonding agent according to a first aspect consists of Portland cement as well as additives, and more specifically comprises 94.70 to 99.79 weight % of Portland cement having a Blaine fineness between 2,500 and 20,000 cm$^2$/g, 0.1 to 2.0 weight % of an organic and/or inorganic accelerator for the hydration of the calcium silicates, 0.1 to 3.0 weight % of an organic and/or inorganic retarding agent which inhibits the hydration of the calcium silicates, and possibly has a liquefying effect, and 0.01 to 0.30 weight % of an inhibiting agent to inhibit the formation of the calcium aluminate sulfate hydrates.

The accelerator in the bonding agent may be an alkali carbonate.

In the bonding agent according to the first aspect, the retarding agent which inhibits the hydration of the calcium silicates may include at least one material selected from the group consisting of an alkali salt of lignosulfonic acid and an alkaline earth salt of lignosulfonic acid. Calcium lignosulfonate is a preferred retarding agent.

In the bonding agent of the first aspect, the inhibiting agent to inhibit the formation of calcium aluminate sulfate hydrates may include at least one material selected from the group consisting of tartaric acid, citric acid, water-soluble salts of tartaric acid, water-soluble salts of citric acid, and alkali salts of tartaric acid and alkali salts of citric acid.

The bonding agent of the first aspect may contain 98.00 to 99.39 weight % of Portland cement, whose Blaine fineness is between 2,500 and 6,000 cm$^2$/g, 0.5 to 1.5 weight % of an alkali carbonate as the accelerator, 0.1 to 0.4 weight % of the retarding agent which inhibits the hydration of the calcium silicates, 0.01 to 0.1 weight % of the inhibiting agent, the inhibiting agent inhibiting the hydration of the calcium aluminate sulfates.

The bonding agent of the first aspect may contain 94.70 to 99.39 weight % of Portland cement, the Portland cement having a Blaine fineness of between 9,000 and 20,000 cm$^2$/g, 0.5 to 2.0 weight % of an alkali carbonate as the accelerator, 0.1 to 3.0 weight % of the retarding agent which inhibits the hydration of the calcium silicates, 0.01 to 0.3 weight % of the inhibiting agent, the inhibiting agent inhibiting the hydration of the calcium aluminate sulfates.

The bonding agent of the first aspect may use an alkali carbonate as the accelerator and may contain:

5 to 95 weight % of a first bonding substance characterized by a content of 98.00 to 99.39 weight % of Portland cement having a Blaine fineness between 2,500 and 6,000 cm$^2$/g, 0.5 to 1.5 weight % of the accelerator, 0.1 to 0.4 weight % of the retarding agent, 0.01 to 0.1 weight % of the inhibiting agent; and 5 to 95% weight of a second bonding substance characterized by a content of: 94.70 to 99.39 weight % of Portland cement having a Blaine fineness between 9,000 and 20,000 cm$^2$/g, 0.5 to 2.0 weight % of the accelerator, 0.1 to 3.0 weight % of the retarding agent, 0.01 to 0.3 weight % of the inhibiting agent.

The Portland cement used in the bonding agent of the first aspect may be a sulfate resistant Portland cement.

The Portland cement used in the bonding agent of the first aspect may contain additives selected from the group consisting of limestone, fly ash, sand and trass.

The bonding agent of the first aspect is free of calcium aluminate additives.

The invention therefore also provides a quick-hardening cement system which, by means of the variation of particularly Portland cement types of a medium and high specific fineness in a mixture with alkali carbonate and lignosulfonate, permits the control of the hardening time as well as the adjustment of the hardening characteristic within a wide range. In this case, higher proportions of very fine cement, as a rule, result in higher early strengths as well as in higher final strengths of the mortar and the concrete.

We claim:

1. A quick-hardening hydraulic bonding agent consisting of Portland cement as well as additives, comprising:
   94.70 to 99.79 weight % of Portland cement having a Blaine fineness between 2,500 and 20,000 cm$^2$/g,
   0.1 to 2.0 weight % of an alkali carbonate,
   0.1 to 3.0 weight % of at least one material selected from the group consisting of an alkali salt of lignosulfonic acid and an alkaline earth salt of lignosulfonic acid, and
   0.01 to 0.30 weight % of at least one material selected from the group consisting of tartaric acid, citric acid, water-soluble salts of tartaric acid, water-soluble salts of citric acid, alkali salts of tartaric acid and alkali salts of citric acid,
   the bonding agent being produced without the addition of calcium aluminate, such that any calcium aluminate present in the bonding agent is derived from the Portland cement.

2. A bonding agent according to claim 1, wherein the alkaline earth salt of lignosulfonic acid is calcium lignosulfonate.

3. A bonding agent according to claim 1, comprising:
   98.00 to 99.39 weight % of Portland cement, whose Blaine fineness is between 2,500 and 6,000 cm$^2$/g,
   0.5 to 1.5 weight % of the alkali carbonate,
   0.1 to 0.4 weight % of the at least one material selected from the group consisting of an alkali salt of lignosulfonic acid and alkaline earth salt of lignosulfonic acid, and
   0.01 to 0.1 weight % of the at least one material selected from the group consisting of tartaric acid, citric acid, water-soluable salts of tartaric acid, water-soluble salts of citric acid, alkali salts of tartaric acid and alkali salts of citric acid.

4. A bonding agent according to claim 1, comprising:
   94.70 to 99.39 weight % of Portland cement, the Portland cement having a Blaine fineness of between 9,000 and 20,000 cm$^2$/g,
   0.5 to 2.0 weight % of the alkali carbonate,
   0.1 to 3.0 weight % of the at least one material selected from the group consisting of an alkali salt of lignosulfonic acid and an alkaline earth salt of lignosulfonic acid,
   0.01 to 0.3 weight % of the at least one material selected from the group consisting of tartaric acid, citric acid, water-soluble salts of tartaric acid, water-soluble salts of citric acid, alkali salts of tartaric acid and alkali salts of citric acid.

5. A bonding agent according to claim 1, wherein said bonding agent comprises:
   5 to 95 weight % of a first bonding substance characterized by a content of 98.00 to 99.39 weight % of Portland cement having a Blaine fineness between 2,500 and 6,000 cm$^2$/g, 0.5 to 1.5 weight % of the alkali carbonate, 0.1 to 0.4 weight % of the at least one material selected from the group consisting of an alkali salt of lignosulfonic acid and an alkaline earth salt of lignosulfonic acid, and 0.01 to 0.1 weight % of the at least one material selected from the group consisting of: tartaric acid, citric acid, water-soluble salts of tartaric acid, water-soluble salts of citric acid, alkali salts of tartaric acid and alkali salts of citric acid; and
   5 to 95% weight of a second bonding substance characterized by a content of 94.70 to 99.39 weight % of Portland cement having a Blaine fineness between 9,000 and 20,000 cm$^2$/g, 0.5 to 2.0 weight % of the alkali carbonate, 0.1 to 3.0 weight % of the at least one material selected from the group consisting of an alkali of lignosulfonic acid and an alkaline earth salt of lignosulfonic acid, and 0.01 to 0.3 weight % of the at least one material selected from the group consisting of tartaric acid, citric acid, water-soluble salts of tartaric acid, water-soluble salts of citric acid, alkali salts of tartaric acid and alkali salts of citric acid.

6. A bonding agent according to claim 1, wherein the Portland cement is sulfate resistant.

7. A bonding agent according to claim 5, wherein the Portland cement is sulfate resistant.

8. A bonding agent according to claim 1, wherein the Portland cement is made water-proof by adding caulking material.

9. A bonding agent according to claim 1, wherein the Portland cement contains additives selected from the group consisting of limestone, fly ash, sand and trass.

* * * * *